United States Patent
Lemcke et al.

(10) Patent No.: US 9,501,567 B2
(45) Date of Patent: Nov. 22, 2016

(54) USER-GUIDED MULTI-SCHEMA INTEGRATION

(75) Inventors: Jens Lemcke, Karlsruhe (DE); Muhammad Wasimullah Khan, Stockholm (SE); Gunther Stuhec, Heidelberg (DE)

(73) Assignee: SAP SE, Walldorf (DE)

( * ) Notice: Subject to any disclaimer, the term of this patent is extended or adjusted under 35 U.S.C. 154(b) by 503 days.

(21) Appl. No.: 13/368,845

(22) Filed: Feb. 8, 2012

(65) Prior Publication Data
US 2013/0204909 A1 Aug. 8, 2013

(51) Int. Cl.
*G06F 17/30* (2006.01)

(52) U.S. Cl.
CPC .............................. *G06F 17/30731* (2013.01)

(58) Field of Classification Search
CPC .............. G06F 17/30; G06F 17/30241; G06F 17/30395; G06F 17/30625; G06F 17/30731; G06F 17/30864; G06F 17/30908; G06F 17/30914; G06F 17/30734; G06F 17/30292; G06F 17/30293; G06F 17/30294; G06F 17/30295; G06F 17/30296; G06F 17/30297
USPC ................................................ 707/749, 758
See application file for complete search history.

(56) References Cited

U.S. PATENT DOCUMENTS

| | | | |
|---|---|---|---|
| 5,701,453 A * | 12/1997 | Maloney et al. | 707/714 |
| 7,143,339 B2 * | 11/2006 | Weinberg | G06F 17/243 707/E17.006 |
| 8,655,913 B1 * | 2/2014 | Shah et al. | 707/780 |
| 2007/0150443 A1 * | 6/2007 | Bergholz | G06F 17/30569 |
| 2007/0239742 A1 * | 10/2007 | Saha et al. | 707/101 |
| 2008/0021912 A1 | 1/2008 | Seligman et al. | |
| 2008/0147713 A1 * | 6/2008 | Lemcke et al. | 707/102 |

(Continued)

OTHER PUBLICATIONS

Cheng Chin Pang et al., "Domain-Specific Ontology Mapping by Corpous-Based Semantic Similarity," Proceedings of 2008 NSF CMMI Engineering Research and Innovation Conference, Jan. 1, 2008, 9 pages.

(Continued)

*Primary Examiner* — James Trujillo
*Assistant Examiner* — Fariborz Khoshnoodi
(74) *Attorney, Agent, or Firm* — Fish & Richardson P.C.

(57) ABSTRACT

Methods, systems, and computer-readable storage media for user-guided multi-schema integration and include actions of receiving a plurality of schemas, each schema defining a data structure and including a plurality of intermediate elements and a plurality of leaf elements, receiving leaf correspondences that match leaf elements between schemas of the plurality of schemas, processing the plurality of schemas and the leaf correspondences using closed frequent itemset mining to define a first plurality of redundancy groups, each redundancy group including a proposed correspondence between intermediate elements of schemas, displaying the first plurality of redundancy groups to a user, receiving user input, the user input including one or more actions to one or more redundancy groups in the first plurality of redundancy groups, processing the plurality of schemas, the leaf correspondences and the one or more actions to define a second plurality of redundancy groups, and displaying the second plurality of redundancy groups.

15 Claims, 6 Drawing Sheets

(56) References Cited

U.S. PATENT DOCUMENTS

2010/0049728 A1    2/2010  Chiticariu et al.

OTHER PUBLICATIONS

Jiawei Han et al., "Frequent pattern mining: current status and future directions," Data Mining and Knowledge Discovery, Jan. 27, 2007, pp. 55-86.

C. Tatsiopoulos et al., "Ontology Mapping Based on Association Rule Mining," International Conference on Enterprise Information Systems, 2009, 8 pages.

European Search Report for European Application No. EP13000162, dated Jul. 26, 2013, 8 pages.

Jim Amsden, IBM, "Capturing requirements with Business Motivation Model, IBM Rational RequisitePro, and IBM Rational Software Modeler," Apr. 2008, retrieved from: http://www.ibm.com/developerworks/rational/library/08/0401_amsden/, 33 pages.

Victor R. Basili et al., "A Methodology for Collecting Valid Software Engineering Data," IEEE Transactions on Software Engineering, vol. SE-10, No. 6, Nov. 1984, pp. 728-738.

Jacob Berlin et al., "Autoplex: Automated Discovery of Content for Virtual Databases," Cooperative Information Systems, CoopIS 2001, Lecture Notes in Computer Science 2172, Sep. 2001, pp. 108-122.

Philip A. Bernstein et al., "Incremental Schema Matching," Proceedings of the 32nd International Conference on Very Large Data Bases, VLDB '06, Sep. 2006, pp. 1167-1170.

Philip A. Bernstein, "Industrial-Strength Schema Matching," ACM SIGMOD Record, vol. 33, No. 4, Dec. 2004, pp. 38-43.

D. Chen et al., "A User Guided Iterative Alignment Approach for Ontology Mapping," Proceedings of the 2008 International Conference on Semantic Web and Web Services, SWWS'08, Jul. 2008, pp. 51-56.

Hong-Hai Do et al., "COMA—A System for Flexible Combination of Schema Matching Approaches," Proceedings of the 28th International Conference on Very Large Data Bases, VLDB '02, Aug. 2002, pp. 610-621.

Hong-Hai Do et al., "Comparison of Schema Matching Evaluations," Proceedings of the Web, Web-Services, and Database Systems: NODe 2002 Web and Database-Related Workshops, Oct. 2002, pp. 221-237.

AnHai Doan et al., "Reconciling Schemas of Disparate Data Sources: A Machine-Learning Approach," Proceedings of the 2001 ACM SIGMOD International Conference on Management of Data, SIGMOD'01, vol. 30, Issue 2, May 2001, 12 pages.

Pavel Shvaiko et al., "A Survey of Schema-Based Matching Approaches," Journal on Data Semantics IV, vol. 3730, Dec. 2005, pp. 146-171.

Sean M. Falconer et al., "Interactive Techniques to Support Ontology Matching," Z. Bellahsene et al. (eds), Schema Matching and Mapping, Data-Centric Systems and Applications, 2011, pp. 29-52.

Jiawei Han et al., "Mining Frequent Patters, Associations, and Correlations," in the Morgan Kaufmann Series in Data Management Systems, Jim Gray, Series Editor, *Data Mining. Concepts and Techniques* ($2^{nd}$ed.), Morgan Kaufmann Publishers, Mar. 2006, pp. 227-283.

Steven Hoberman, "Canonical Data Model," Information Management Magazine, Jul. 23, 2008, retrieved from http://www.information-management.com/issues/2007_50/10001733-1.html, 3 pages.

iGreen, iGreen Project website, retrieved on Oct. 26, 2012 from http://www.igreen-projekt.de/iGreen/, 1 page.

Jens Lemcke, "Scalable Ontological EAI and e-Business Integration," Jul. 17, 2009, Karlsruhe, Germany, 225 pages.

Wen-Syan Li et al., "SemInt—A Tool for Identifying Attribute Correspondences in Heterogeneous Databases Using Neural Network," Data and Knowledge Engineering, vol. 33, Issue 1, 2000, pp. 49-84.

Jayant Madhavan et al., "Generic Schema Matching with Cupid," Proceedings of the 27th International Conference on Very Large Data Bases, VLDB '01, Sep. 2001, pp. 49-58.

Robert McCann et al., "Matching Schemas in Online Communities: A Web 2.0 Approach," Proceedings of the 24th IEEE International Conference on Data Engineering, ICDE 2008, Apr. 2008, pp. 110-119.

Erhard Rahm et al., A Survey of Approaches to Automatic Schema Matching, The VLDB Journal, vol. 10, Issue 4, 2001, pp. 334-350.

Erhard Rahm et al., "Matching large XML Schemas," ACM SIGMOD Record, vol. 33, No. 4, Dec. 2004, pp. 26-31.

Jörg Rechet al., "Intelligent Assistance for Collaborative Schema Governance in the German Agricultural eBusiness Sector," Proceedings of the 12th International Conference on Information Integration and Web-based Applications & Services, iiWAS2010, Nov. 2010, pp. 867-870.

Rini van Solingen et al., "The Goal/Question/Metric Method: a practical guide for quality improvement of software development," McGraw-Hill Publishing Company, 1999, e-book retrieved from http://www.iteva.rug.nl/gqm/GQM%20Guide%20non%20printable.pdf, 216 pages.

Takeaki Uno et al., "An Efficient Algorithm for Enumerating Closed Patterns in Transaction Databases," Proceedings of the $7^{th}$International Conference on Discovery Science, DS'04, Lecture Notes in Computer Science 3245, Oct. 2004, pp. 16-31.

Takeaki Uno et al.,. "LCM ver. 2: Efficient Mining Algorithms for Frequent/Closed/Maximal Itemsets," Proceedings of the Workshop on Frequent Itemset Mining Implementations, FIMI'04, Nov. 2004, 11 pages.

Ian H. Witten et al., "Data Mining: Practical Machine Learning Tools and Techniques," Second Edition, Elsevier Inc., 2005, 558 pages.

Anna V. Zhdanova et al, "Community-Driven Ontology Matching," The Semantic Web: Research and Applications, Lecture Notes in Computer Science, 2006, vol. 4011/2006, pp. 34-49.

\* cited by examiner

USER-GUIDED MULTI-SCHEMA INTEGRATION

BACKGROUND

In computer science, various data structures and associated ontologies can be implemented. Each data structure can be defined based on an associated schema. In some instances, communication between and/or integration of systems having disparate schemas and ontologies may be desired. In such instances, matching of schemas and/or ontologies is required.

The proliferation of the Internet has resulted in large numbers of schemas that are semantically heterogeneous. Semantic heterogeneity arises from differences in naming, structure and context (e.g., organizational, geographical, functional) in which the schemas are being used. Consequently, communication between and/or integration of systems having disparate schemas and ontologies has become an increasingly complex problem. In some instances, the complexity of these tasks requires users to find manual matches between schemas even with the help of commercial tools. However, manual specification of mappings can be both time consuming and error-prone, particularly in view of the number and size of schemas to be matched.

SUMMARY

Implementations of the present disclosure include computer-implemented methods for providing a user-guided multi-schema integration. In some examples, methods include the actions of receiving a plurality of schemas from computer-readable memory, each schema of the plurality of schemas defining a data structure and including a plurality of intermediate elements and a plurality of leaf elements, receiving leaf correspondences from computer-readable memory, the leaf correspondences matching leaf elements between schemas of the plurality of schemas, processing the plurality of schemas and the leaf correspondences using closed frequent itemset mining (CFIM) to define a first plurality of redundancy groups, each redundancy group in the first plurality of redundancy groups including a proposed correspondence between intermediate elements of schemas of the plurality of schemas, displaying, using a display device, the first plurality of redundancy groups to a user, receiving user input, the user input including one or more actions to one or more redundancy groups in the first plurality of redundancy groups, processing the plurality of schemas, the leaf correspondences and the one or more actions to define a second plurality of redundancy groups, and displaying, using a display device, the second plurality of redundancy groups to a user.

In some implementations, the one or more actions include approving a subset of redundancy groups of the first plurality of redundancy groups, the subset including at least one redundancy group, and, in response to approving the subset of redundancy groups, defining one or more respective correspondences between intermediate elements of schemas of the plurality of schemas.

In some implementations, the at least one redundancy group is absent from the second plurality of redundancy groups.

In some implementations, actions further include identifying one or more sub-correspondences based on the subset of redundancy groups, wherein redundancy groups associated with the one or more sub-correspondences are absent from the second plurality of redundancy groups.

In some implementations, actions further include identifying one or more conflicting correspondences based on the subset of redundancy groups, wherein redundancy groups associated with the one or more conflicting correspondences are absent from the second plurality of redundancy groups.

In some implementations, processing the plurality of schemas, the leaf correspondences and the one or more actions to define the second plurality of redundancy groups includes processing the plurality of schemas, the leaf correspondences and the one or more respective correspondences between intermediate elements of schemas of the plurality of schemas.

In some implementations, the one or more actions include disapproving a subset of redundancy groups of the first plurality of redundancy groups, the subset including at least one redundancy group.

In some implementations, the at least one redundancy group is absent from the second plurality of redundancy groups.

In some implementations, actions further include: determining, for each redundancy group in the first plurality of redundancy groups, a rank to provide a plurality of ranks, and determining a rank order based on the plurality of ranks, wherein displaying the first plurality of redundancy groups includes displaying redundancy groups of the first plurality of redundancy groups based on the rank order.

In some implementations, actions further include: determining, for each redundancy group in the second plurality of redundancy groups, a rank to provide a plurality of ranks, and determining a rank order based on the plurality of ranks, wherein displaying the second plurality of redundancy groups includes displaying redundancy groups of the second plurality of redundancy groups based on the rank order.

In some implementations, processing the plurality of schemas and the leaf correspondences using closed frequent itemset mining (CFIM) to define the first plurality of redundancy groups includes transforming schemas of the plurality of schemas into respective linear inputs.

In some implementations, the second plurality of redundancy groups includes redundancy groups of the first plurality of redundancy groups.

In some implementations, actions further include: defining one or more respective correspondences between intermediate elements of schemas of the plurality of schemas based on the one or more actions, and providing a unified data model based on the leaf correspondences and the one or more respective correspondences.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to a user-guided, iterative approach for large-scale multi-schema integration. In some implementations, n schemas are provided as input. Each schema includes nodes (e.g., root nodes, leaf nodes) and relationships between nodes. Leaf correspondences between leaf nodes of the n schemas are also provided as input. The n schemas and the leaf correspondences are processed to iteratively match intermediate elements (e.g., intermediate nodes between root nodes and leaf nodes) between the n schemas. In some implementations, closed frequent itemset mining (CFIM) is used to simultaneously match intermediate elements between the n schemas.

In accordance with implementations of the present disclosure, user activities are complemented with CFIM. In some implementations, the input to CFIM includes the n schemas and known correspondences between elements of the n schemas. The CFIM proposes corresponding intermediary elements based on known correspondences of all descendent elements and leafs. In some examples, and during a first iteration, intermediate correspondence proposals are produced based on given leaf correspondences and are ranked based on a ranking algorithm. In subsequent iterations, user input is taken into account to generate new correspondence proposals and ranking of the correspondence proposals. In some implementations, a unified data model (UDM) is ultimately provided and includes the set of n schemas and a set of correspondences between all elements (e.g., nodes) of the n schemas.

In accordance with implementations of the present disclosure, n schemas and known leaf correspondences are provided as inputs. In some examples, the n schemas are each provided as hierarchical schemas and each of the n schemas is transformed to a linear format (e.g., defining transitions and items from the schema elements). The format is deemed to be linear, because all direct and indirect children (including leaves) of an element are transformed to provide a set of items of a transaction, discussed in further detail below. As items in the transaction, elements are all members of the same set. The n schemas, in linear format, and the known leaf correspondences are provided as inputs to the CFIM algorithm. The CFIM algorithm generates redundancy groups that can be displayed to the user.

In accordance with implementations of the present disclosure, an iterative approach is provided. In the initial iteration, redundancy groups are determined based on the n schemas and the known leaf correspondences. In subsequent iterations, user feedback (e.g., user selection of one or more redundancy groups) is taken into account to improve the displayed redundancy groups. In each iteration, redundancy groups are each associated with a rank value, and are displayed to the user in rank order (e.g., descending order based on rank value). The user can act on the proposed redundancy groups by, for example, approving one or more redundancy groups. An approved redundancy group results in a defined correspondence, or matching, between nodes of the n schemas. The process repeats with user selected correspondences from the previous iteration. The process is repeated until no new matchings are found.

In some implementations, the CFIM algorithm includes a linear time closed itemset mining (LCM) approach. In some examples, LCM is very efficient, taking only linear time of the number of closed frequent itemsets. In some examples, LCM defines parent-child relationship between frequent closed itemsets, which results in a graph representation forming a tree. In order to enumerate all closed frequent itemsets, LCM traverses the tree in depth-first manner, without storing the tree in memory. Starting from the root element, LCM traverses the tree, until it reaches the leaf element. LCM backtracks to find other child elements of the root. By repeating this process, LCM yields all closed frequent itemsets.

In some aspects, the terms transaction and item are used in discussions of frequent itemset mining. For example, input to frequent itemset mining is a set of transactions, each transaction is associated to a set of items. Consequently, in frequent itemset mining, a set of items is searched that appears frequently in the transactions (e.g., that is in two or more transactions). In some examples, a frequent itemset is closed if and only if there is no larger itemset that is shared by the same set of transations. As used herein, the term redundancy group is provided as the set of transactions sharing a closed frequent itemset.

As discussed in further detail herein, the term element is mapped to the notions of transaction and item to apply frequent itemset mining. For example, to determine the similarity between two elements e1 and e2 of two different schemas S1 (containing e1) and S2 (containing e2), e1 can be considered a transaction and all inferior elements in S1 can be considered items of e1, and e2 can be considered another transaction with all inferior elements in S2 being items of e2. Correspondences between items of e1 and items of e2 are provided in the given leaf correspondences and subsequent user-approved correspondences of the intermediary elements.

The result of the CFIM processing is redundancy groups. Each redundancy group is composed of redundant transactions, and are called redundant, because the transactions in each group share the same set of items. A transaction includes a proposed correspondence between intermediate elements of the n schemas. The set of transactions in a redundancy group can also be referred to as a correspondence. As discussed in further detail herein, the redundancy groups are proposed (e.g., displayed to the user) as proposals (e.g., proposed correspondences between intermediate elements of the n schemas). In view of the displayed redundancy groups (i.e., the proposed correspondences), the user can judge the proposals and make a selection. In some examples, judging can involve acknowledging or approving one or more redundancy groups, disapproving one or more redundancy groups and/or making corrections (e.g., editing) one or more redundancy groups. An approved redundancy group can be referred to as a correspondence, because it defines a correspondence between intermediate elements of the n schemas. In some implementations, user effort can be minimized by generating redundancy groups (i.e., proposed correspondences) that the user only needs to acknowledge or approve.

The user feedback (e.g., approval or disapproval of redundancy group(s)) builds on the initial information that was provided. In a learning approach, the quality of redundancy groups increases with user feedback, while the effort required to match and construct a redundancy group decreases. In some examples, actions are executed based on user feedback. Example measures include hiding and adaptation of redundancy groups. In some examples, hiding refers to removing a redundancy group from a list of proposed redundancy groups. In some examples, adaptation refers to modification of a redundancy group such that it does not conflict with one or more already approved redundancy groups.

In some implementations, hiding a redundancy group is provided to reduce the number of proposed redundancy groups displayed to the user. Consequently, redundancy groups that have already been approved or disapproved by the user are hidden in subsequent lists of proposed redundancy groups. In some implementations, disapproval of a redundancy group results in hiding only that particular redundancy group. This is because the disapproved redundancy group does not add to information about other proposed redundancy groups.

Approval of a redundancy group can provide valuable insight. In some implementations, and with respect to hiding, not only the approved redundancy group is hidden, but any redundancy group reflecting a sub-correspondence, if one exists, is also removed from the list of redundancy groups. By way of non-limiting example, the set {ABC} can be a proposed correspondence (i.e., a proposed correspondence between intermediate element A, intermediate element B and intermediate element C of n schemas) and can be provided in a first redundancy group. Any subset of the set {ABC} is a sub-correspondence. Example subsets can include {AB}, {BC} and {AC}, and can be provided in a second redundancy group, a third redundancy group and a fourth redundancy group, respectively.

Continuing with the non-limiting example, if the user indicates that the first redundancy group is a match (e.g., the set {ABC} defines a correspondence between intermediate elements), then {AB}, {BC} and {AC} must be a match too. Consequently, and in the next iteration, not only is the first redundancy group hidden, but the second, third and fourth redundancy groups are also hidden in the subsequent list of proposed redundancy groups.

In another example, the user can select the second redundancy group (i.e., the set {AB}) and the third redundancy group (i.e., {BC}) as matches (i.e., instead of the first redundancy group and/or the fourth redundancy group) (e.g., the user comes across these redundancy groups first). Using the transitive property, it can be determined that the fourth redundancy group (i.e., {AC}) and, hence, the first redundancy group (i.e., {ABC}) are also matches. In this case, not only are the user approved redundancy groups hidden, but any other redundancy groups that are also determined to be a match as a result of the user input.

In another example, if only the second redundancy group (i.e., the set {AB}) is approved by the user, no determination is made with respect to the first redundancy group, because the relationship between {AC} and {BC} is yet unknown. Consequently, and in this case, the first redundancy group remains in the list of proposed redundancy groups.

In some implementations, adaptation of redundancy groups in subsequent iterations can occur in response to approval of one or more redundancy groups in a previous iteration. By way of non-limiting example, and for purposes of illustration, the following redundancy groups for examples schemas A, B and C can be considered:

g1: A.InvoiceTo, B.BillTo, C.Invoice_To
g2: A.InvoiceTo, B.Address, C.Address
g3: A.InvoiceTo, C.Organization
g4: A.InvoiceTo, B.BillTo, D.Address The user approves the redundancy group g1. Consequently, the A.InvoiceTo element of schema A can only form a correspondence with the B.BillTo element of schema B and the C.Invoice_To element of schema C.

If the transaction (e.g., A.InvoiceTo) from an approved redundancy group (e.g., g1) forms a correspondence with any other schema element (e.g., B.Address, C.Address) besides already approved redundancy group (e.g. B.BillTo, C.Invoice_To), the transaction from an approved redundancy group is determined to be in conflict. In order to determine that a conflict is present, an adaptation algorithm determines whether any of the transactions (e.g., A.InvoiceTo, B.BillTo or C.Invoice_To) from an approved redundancy group exists in another proposed redundancy group (e.g., g2, g3 and g4). In the non-limiting example above, A.InvoiceTo exists in all other redundancy groups g2, g3 and g4, while B.BillTo exists in the redundancy group g4. Consequently, it can be determined that A.InvoiceTo is in conflict with B.Address and C.Address in g2 and with C.Organization in g3. The conflicting transaction(s) can be removed from the remaining redundancy group in order to make it valid. Continuing with the non-limiting example above, the group g2 can be adapted to provide:

g2': B.Address, C.Address

Similarly, A.InvoiceTo can be removed from the redundancy group g3, to provide an adapted redundancy group g3' that includes a single transaction. In some examples, adapted redundancy groups can be removed (hidden) from the list of proposed redundancy groups. In the example above, the adapted redundancy group g3' can be hidden, because it provides little insight into correspondences.

Continuing with the non-limiting example above, another schema D can be included in the n schemas, the schema D not including an element in the approved redundancy group g1. If any of the transactions from an approved redundancy group (A.InvoiceTo, B.BillTo, C.Invoice_To) form a correspondence with a schema with which currently no correspondence exists (e.g., schema D), such a redundancy group will not be affected. In the non-limiting example, the redundancy group g4 remains unaffected as it could still result in a valid correspondence.

In some implementations, backtracking is provided and enables a user to retrace earlier judgments (e.g., the user determines that a mistake had been made). In some examples, it can be determined that a mistake may have been made by reviewing a current list of proposed redundancy groups. For example, approval of an undesired, or inaccurate redundancy group can result in inaccurate redundancy groups provided in a subsequent list of redundancy groups.

In some examples, and in order to facilitate backtracking, two separate lists can be displayed. A first list can include previously approved redundancy groups in the iteration they were approved. In some examples, the user can select (e.g., click on) an approved redundancy group and, in response, redundancy groups that had been hidden as a result of the approved redundancy group can be displayed. A second list can include hidden redundancy groups. In some examples, the user can select (e.g., click on) a hidden redundancy group and, in response, the approved redundancy group that resulted in hiding of the selected redundancy group can be displayed.

In some implementations, individual group-level and/or iteration-level backtracking can be provided. In individual group-level backtracking, the user can edit a redundancy group and can acknowledge or disapprove the redundancy group altogether. Consequently, hidden redundancy groups due to the redundancy group in question are again displayed in the list of proposed redundancy groups. In iteration-level backtracking, user can enter an iteration number, to which user wants to backtrack. Consequently, the redundancy group(s) that correspond(s) to the particular iteration are restored.

In some implementations, and as discussed above, redundancy groups in a list of proposed redundancy groups each include an associated ranking and are displayed in rank order. In some examples, and by ranking the redundancy groups, redundancy groups that are potentially more relevant are displayed higher in the list of proposed redundancy groups. By way of non-limiting example, and for purposes of illustration, ranking will be discussed in the context of the following example message structures:

| Message Type | Elements |
|---|---|
| Customer | ID, Name, DateOfBirth, Phone, City, Street, State, Zip, Country |
| Partner | ID, Name, DateOfBirth, Phone, City, Street, State, Zip, Country |
| Party | ID, Name, Email, Address |
| Buyer Party | ID, Phone, Fax, Address |

In this example, the types include overlapping elements. The overlapping (or common) elements lead to redundant types. That is, the types that share the same set of elements. Processing the example message structures using CFIM can result in the following set of proposed redundancy groups:

| Redundancy Group | Redundant Types | Common Elements |
|---|---|---|
| g1 | Customer, Partner, Party, Buyer Party | ID |
| g2 | Customer, Partner | ID, DateOfBirth, City, Country |
| g3 | Customer, Party | ID, Name |
| g4 | Customer, BuyerParty | ID, Phone |
| g5 | Partner, Party | ID, Email |
| g6 | Partner, BuyerParty | ID, Fax |
| g7 | Party, BuyerParty | ID, Address |

In this relatively simple, non-limiting example, it can already be seen that some redundancy groups are more interesting than others. For example, g2, although shared among fewer types, has more common elements, and is thus more interesting, than g1, which only shares one common element. In other examples, several such cases can be present. Consequently, by ranking redundancy groups, redundancy groups that are potentially more relevant are displayed higher in the list of proposed redundancy groups.

In some implementations, ranking of redundancy groups can be based on a plurality of factors. Example factors can include the number of types of transactions in a redundancy group, the number of common elements that forms the core of a redundancy group, and the number of uncommon elements in a redundancy group. In some examples, if the ratio of common elements to uncommon elements for a first redundancy group (e.g., g1) is higher than the ration for a second redundancy group (e.g., g2), then the first redundancy group is potentially more interesting than the second redundancy group.

In accordance with implementations of the present disclosure, the following relationships can be provided:

$$\tau = |T(A)|$$

$$\upsilon = \frac{\kappa}{\alpha}$$

where A is a set of shared items, T(A) is the set of transactions sharing A, $\tau$ is the number of redundant transactions, $\kappa=|A|$ is the number of shared items, $\alpha$ is the average number of total elements (intermediary+leaves) of all transactions of T(A), and $\upsilon$ is the ratio of shared items to the average number of elements.

In some implementations, an example algorithm for calculating the number of shared items ($\kappa$) can be provided as:
  For each transaction $t_i$:
    a. Find topmost elements $TI_i$ with agreed correspondences according to the group $$\rightarrow \#t_i \mathrel{+}= \#\text{children}(TI) + |TI|$$

b. Find further core elements CI above TI $$\rightarrow \#t_i \mathrel{+}= |CI|$$

$$\kappa := \text{AVG}_{i \in I}(\#t_i)$$

where every element is assigned a value of 1 and the value of a parent element is provided as a sum of the sizes of all its child elements and its own size. For example, a parent element having three child elements is 4 (i.e., 3+1=4). When every element's size is known, the size of transaction is calculated by adding the elements' sizes plus the size of the element being considered itself.

The example algorithm operates by finding the topmost elements that are part of a correspondence for each transaction in a group. The topmost item with agreed correspondence is the highest element in the hierarchy for which a match exists in other schema(s). In an initial iteration, only leaf correspondences are known. Consequently, leaf nodes can be provided as the topmost items with correspondence. Once topmost items for a transaction are found, the size of each is calculated, as discussed above. The number of common elements is determined as a ratio of the sum of the topmost items for each transaction to the number of transactions.

In some implementations, the example algorithm can be used to calculate the average number of elements ($\alpha$). In this case, however, all of the children of a transaction contribute to the size irrespective of whether or not there exists a match. Consequently, the average number of elements offsets the effect of an element higher up the hierarchy. The higher the average number of elements, the lower the ratio of common to average number of elements ($\upsilon$).

For each redundancy group, a rank (ρ) is determined based on τ,κ and ν. In some examples, each of σ, κ and ν can be normalized by the maximum value they have among all redundancy groups. In some examples, normalizing can be based on the following example relationships:

$$\frac{\tau}{\hat{\tau}}, \frac{\kappa}{\hat{\kappa}}, \frac{\nu}{\hat{\nu}} \text{ each ranging between } [0, 1]$$

where the denominators reflect the maximum values among all redundancy groups.

Figure 1A:
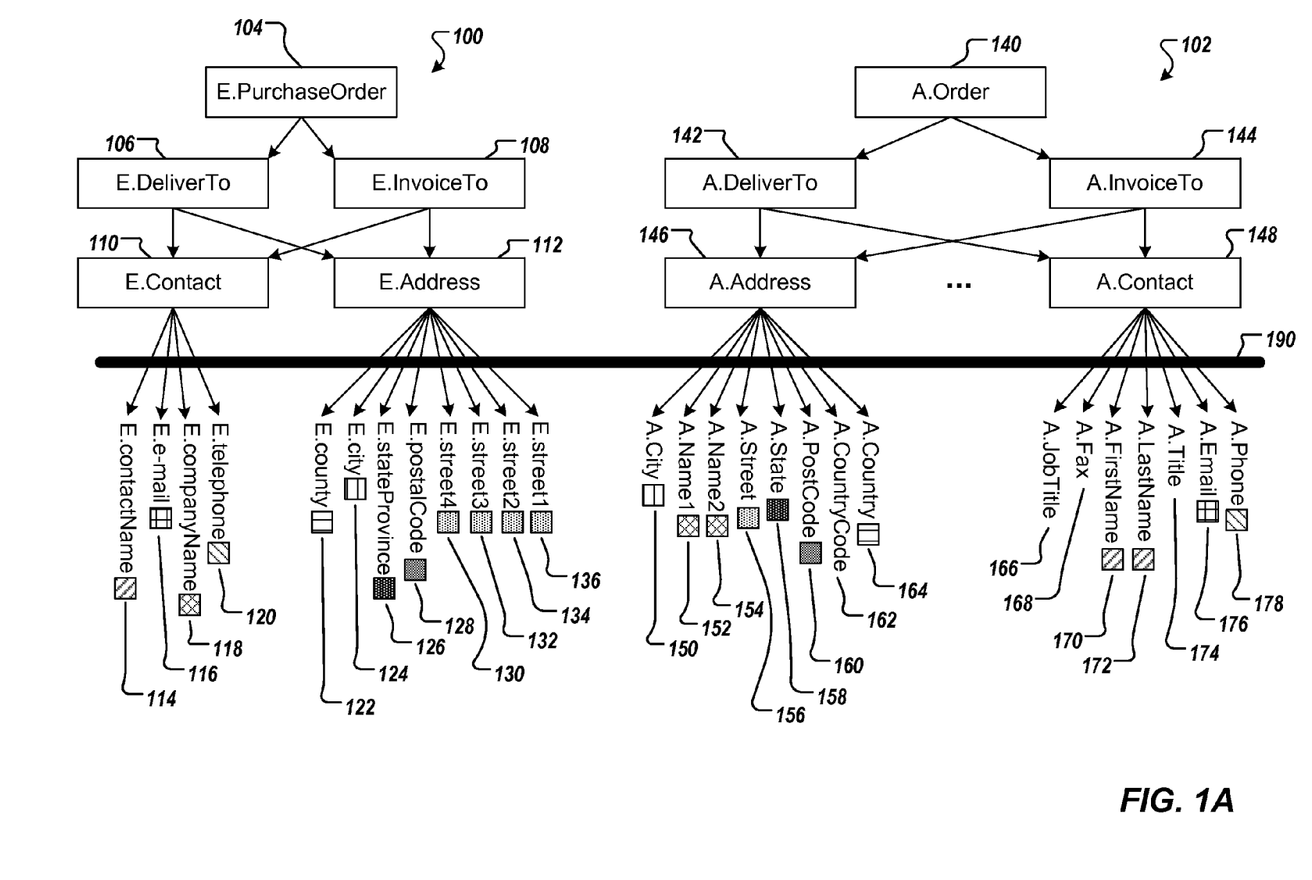
FIG. 1A depicts example first and second schemas.
Figure 1B:
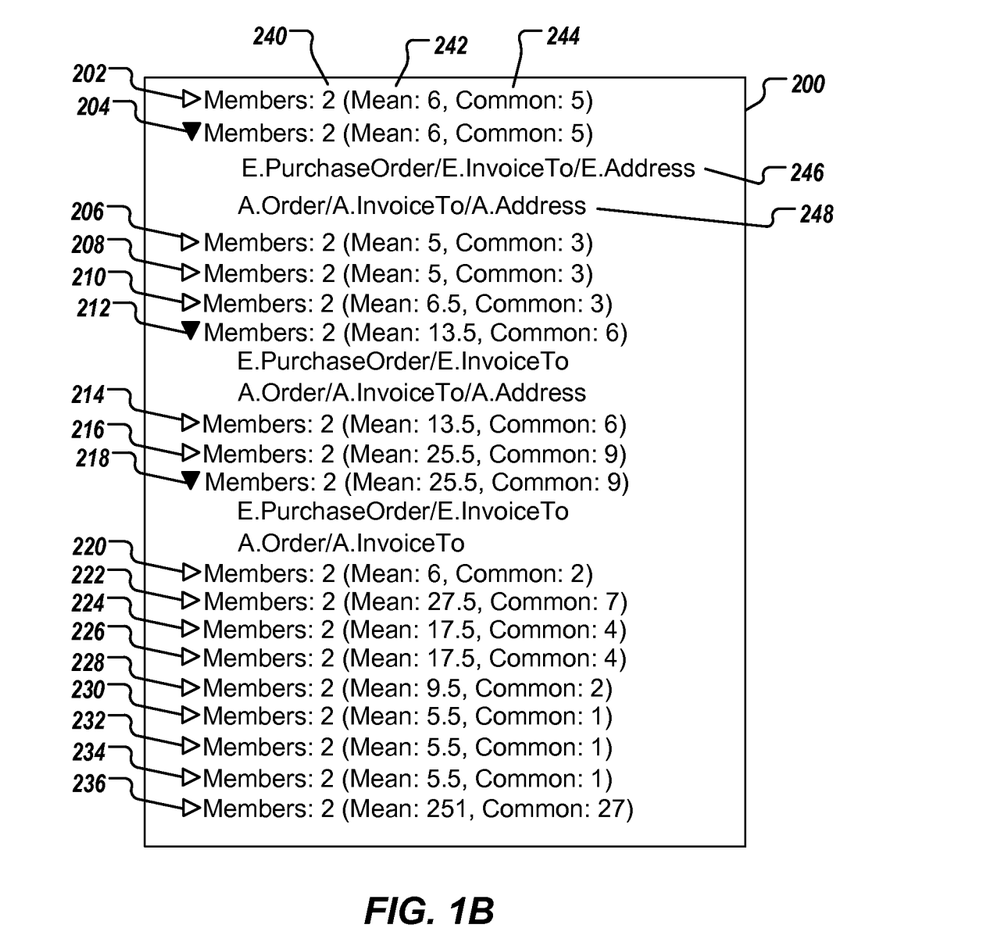
FIG. 1B depicts example redundancy groups determined for the example first and second schemas of FIG. 1A.

In some examples, the combination of the normalized values is represented by a product operation, such that the rank (p) of a redundancy group can be provided as:

$$\rho = \sigma\left(\frac{\tau}{\hat{\tau}} \cdot \frac{\kappa}{\hat{\kappa}} \cdot \frac{\nu}{\hat{\nu}}\right) \quad 0 < \rho < \sigma$$

where σ is a scaling factor. The redundancy groups can be displayed in rank order (e.g., descending) based on their respective ranks Referring now to FIGS. 1A and 1B an example, initial iteration will be described. FIG. 1A depicts example first and second schemas 100, 102, respectively. The first schema 100 includes nodes 104, 106, 108, 110, 112, 114, 116, 118, 120, 122, 124, 126, 128, 130, 132, 134, 136. The first schema 100 includes a hierarchy, in which the node 104 can be provided as a root node and the nodes 114-136 can be provided as leaf nodes, with the nodes 106-112 being provided as intermediate nodes. The second schema 102 includes nodes 140, 142, 144, 146, 148, 150, 152, 154, 156, 158, 160, 162, 164, 166, 168, 170, 172, 174, 176 and 178. The second schema 102 includes a hierarchy, in which the node 140 can be provided as a root node and the nodes 150-178 can be provided as leaf nodes, with the nodes 142-148 being provided as intermediate nodes.

In the depicted example, the leaf nodes 114-120 are child nodes of the intermediate node 110, the intermediate node 110 is a child node of the intermediate nodes 106, 108, and the intermediate nodes 106, 108 are each a child node of the root node 104. Further, the leaf nodes 122-136 are child nodes of the intermediate node 112, which is a child node of the intermediate nodes 106, 108. In the depicted example, the leaf nodes 150-164 are child nodes of the intermediate node 146, the intermediate node 146 is a child node of the intermediate nodes 142, 144, and the intermediate nodes 142, 144 are each a child node of the root node 140. Further, the leaf nodes 166-178 are child nodes of the intermediate node 148, which is a child node of the intermediate nodes 142, 144. It is appreciated that the first schema 100 and the second schema 102 of FIG. 1A are examples schemas and can include more or fewer nodes and/or different hierarchical relationships between nodes.

A leaf node correspondence can be provided. The leaf node correspondence provides a matching between leaf nodes of the first schema 100 and leaf nodes of the second schema 102. In the depicted example, the leaf node correspondence is visually represented based on fills associated with each leaf node. For example, the leaf node 114 (E.contactName) corresponds to the lead node 170 (A.FirstName) and the leaf node 172 (A.LastName). The leaf node 116 (E.e-mail) corresponds to the leaf node 176 (A.Email). The leaf node 118 (E.companyName) corresponds to the leaf node 152 (A.Name1) and the leaf node 154 (A.Name2). The leaf node 162 (A.CountryCode), the leaf node 166 (A.JobTitle), the leaf node 168 (A.Fax) and the lead node 174 (A.Title) have no correspondences. Other leaf correspondences can be seen in FIG. 1A and are discussed in further detail herein.

With continued reference to FIG. 1A, a confidence bar 190 is depicted. The confidence bar 190 delineates confidence levels associated with node correspondences between the first and second schemas 100, 102. In the depicted example, node correspondences below the confidence bar 190 reflect a 100% confidence level and node correspondences above the confidence bar 190 reflect less than 100% confidence level(s). For example, and because the leaf node correspondences are given, the confidence bar 190 is positioned to reflect that there is a 100% confidence in the leaf node correspondences.

In some implementations, and above the confidence bar 190, confidence levels vary depending on the position of intermediate elements in the hierarchy. In some examples, a bottom-up approach is used such that the higher the elements in the hierarchy, the less confident the correspondences are. This is because less information is available higher up in the hierarchy from the current position of the confidence bar 190.

As discussed in further detail herein, and in a first iteration, the schemas and the leaf node correspondences are processed using CFIM to generate a plurality of redundancy groups. In some implementations, the schemas and the leaf node correspondences are provided as input to a CFIM algorithm that generates an output including the plurality of redundancy groups. Each redundancy group provides a potential correspondence between intermediate nodes of the schemas and is associated with a rank, an element count and one or more metrics. The redundancy groups are displayed in rank order based on the rank. The element count includes the number of schema elements provided in the particular redundancy group. Example metrics include a mean value and a common value. In some examples, the mean value indicates the average number of direct and indirect child elements each element in the redundancy set includes. In some examples, the common value indicates the number of corresponding nodes including leaves and intermediate nodes. In some examples, and as discussed further below, a one-to-one leaf node correspondence and a one-to-many leaf node correspondence are each counted as a single correspondence.

With continued reference to the example of FIG. 1A, the first and second schemas 100, 102 and the leaf node correspondences are processed using CFIM to generate a plurality of redundancy groups. In some implementations, the first and second schemas 100, 102 and the leaf node correspondences are provided as input to a CFIM algorithm that generates an output including the plurality of redundancy groups. FIG. 1B depicts example redundancy groups 200 determined for the example first and second schemas of FIG. 1A. In the depicted example, the redundancy groups 200 include redundancy groups 202, 204, 206, 208, 210, 212, 214, 216, 218, 220, 222, 224, 226, 228, 230, 232, 234 and 236. In some implementations, the redundancy groups 202-236 are displayed to a user and can be activated (e.g., clicked on) to provide further detail. In the depicted example, the redundancy groups 204, 212 and 218 have been activated to reveal respective further detail. Each of the redundancy groups 202-236 is associated with an element count 240 and respective metrics 242, 244.

In some examples, slash-notation is used to refer to elements in the redundancy group. In particular, a particular element is identified after the last slash. The elements before the last slash describe the path from the root to the particular element. By way of non-limiting example, "PurchaseOrder/ customer/address" and "PurchaseOrder/buyer/address" refer to respective elements, both of which are provided as "address."

With particular reference to the redundancy group 204, the element count is equal to 2, the mean value is equal to 6 and the common value is equal to 5. The element count is equal to 2, because the redundancy group 204 includes a first element 246 and a second element 248. In the depicted example, the first element 246 includes E.PurchaseOrder/ E.InvoiceTo/E.Address corresponding to the path from the root node 104 to the intermediate node 112, and the second element 248 includes A.Order/A.InvoiceTo/A.Address corresponding to the path from the root node 140 to the intermediate node 146. The mean value is equal to 6, because the intermediate node 112 is associated with 5 unique items and the intermediate node 146 is associated with 7 unique items. More particularly, items mapped on the same item in another schema all count as 1. Therefore, each unique item can be listed as a set in the following example list of items of E.Address: ({street1, street2, street3, street4}, {postalCode}, {stateProvice}, {city}, {country}) and of A.Address: ({country}, {countryCode}, {postCode}, {State}, {Street}, {Name1, Name2}, {City}), where the brackets { } each define a unique item.

The common value is equal to 5, because there are 5 leaf node correspondences between the leaf nodes 122-136 of the intermediate node 112 and the leaf nodes 150-164 of the intermediate node 146. More particularly, the leaf node 164 corresponds to the leaf node 122 (i.e., one-to-one correspondence), the leaf node 160 corresponds to the leaf node 128 (i.e., one-to-one correspondence), the leaf node 158 corresponds to the leaf node 126 (i.e., one-to-one correspondence), the leaf node 156 corresponds to the leaf nodes 130, 132, 134, 136 (i.e., a one-to-many correspondence), and the leaf node 150 corresponds to the leaf node 124 (i.e., one-to-one correspondence) for a total of 5 leaf correspondences.

With continued reference to FIGS. 1A and 1B, the redundancy group 204 provides a suggested correspondence between the intermediate node 112 (E.Address) and the intermediate node 146 (A.Address). The redundancy group 212 provides a suggested correspondence between the intermediate node 108 (E.InvoiceTo) and the intermediate node 146 (A.Address). The redundancy group 218 provides a suggested correspondence between the intermediate node 108 (E.InvoiceTo) and the intermediate node 144 (A.InvoiceTo). In the example of FIG. 1B, the redundancy group 204 is ranked higher than the redundancy groups 212, 218, because "Address" is lower in the schema hierarchies than "InvoiceTo." In other words, there is higher confidence in the accuracy of the suggested correspondence provided by the redundancy group 204, because relatively more is known about this proposal (i.e., it is right above the leaf node correspondence in the hierarchy, which is 100% known).

Figure 2A:
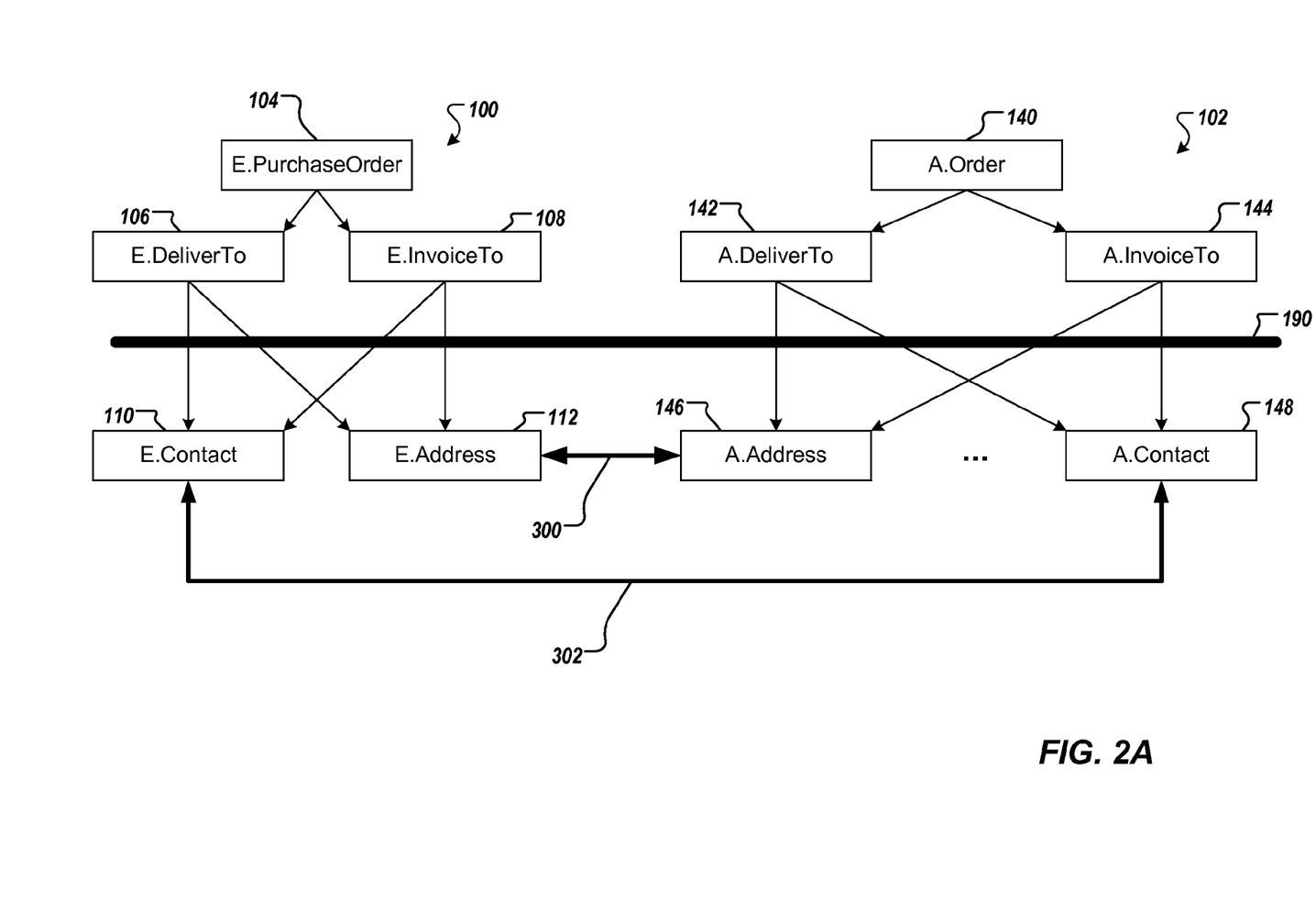
FIG. 2A depicts an example correspondence between the first and second schemas of FIG. 1A based on the example redundancy groups of FIG. 1B.

With particular reference to FIGS. 1B and 2A, user input can be received indicating a selection of the redundancy group 204 to define a correspondence between the intermediate node 112 (E.Address) and the intermediate node 146 (A.Address), and another redundancy group to define a correspondence between the intermediate node 110 (E.Contact) and the intermediate node 148 (A. Contact). In this manner, and with reference to FIG. 2A, respective correspondences 300, 302 between the intermediate node 112 (E.Address) and the intermediate node 146 (A.Address) and between the intermediate node 110 (E.Contact) and the intermediate node 148 (A.Contact) are defined. Consequently, the confidence bar 190 is moved upward, because correspondences between the leaf nodes and the intermediate nodes at the first hierarchical level above the leaf node hierarchical level are defined.

Figure 2B:
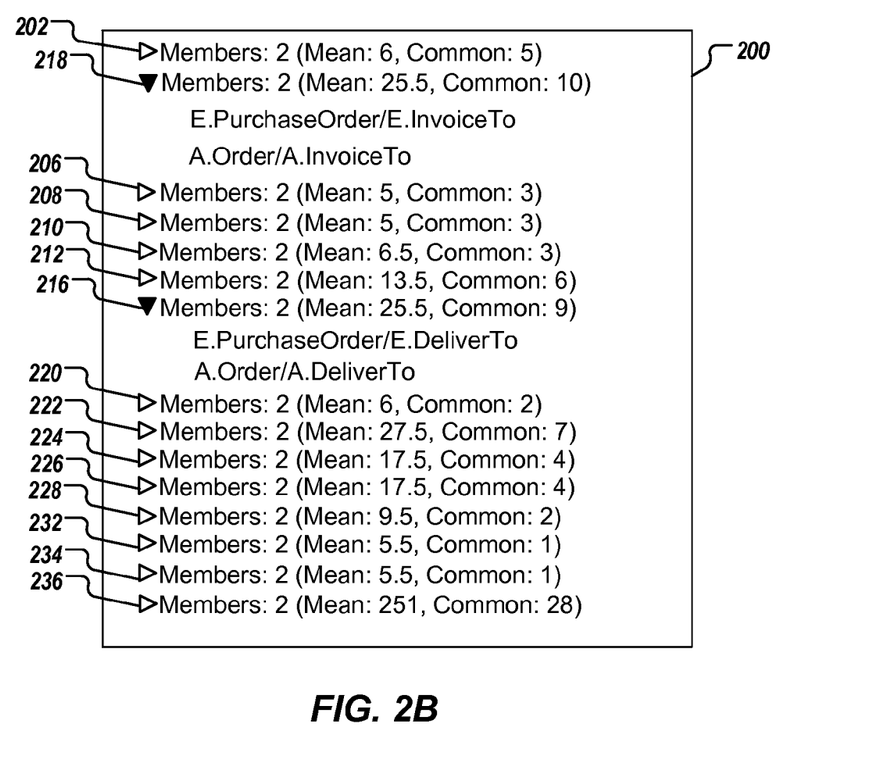
FIG. 2B depicts example redundancy groups determined for the example first and second schemas of FIG. 2A.

With reference to FIGS. 2A and 2B, the first and second schemas 100, 102, the leaf node correspondences and the intermediate element correspondences 300, 302 are processed using CFIM to generate a plurality of redundancy groups. In some implementations, the first and second schemas 100, 102, the leaf node correspondences and the intermediate element correspondences 300, 302 are provided as input to the CFIM algorithm that generates an output including the plurality of redundancy groups. FIG. 2B depicts example redundancy groups 200 determined for the example first and second schemas of FIGS. 1A and 2A. In the depicted example, the redundancy groups 200 include the redundancy groups 202, 218, 206, 208, 210, 212, 216, 220, 222, 224, 226, 228, 232, 234 and 236. The redundancy groups 202, 218, 206-212, 216, 220-228 and 232-236 are displayed in rank order. The ranking associated with each redundancy group 202, 218, 206-212, 216, 220-228 and 232-236 is determined in view of the known correspondences (i.e., the leaf node correspondences and the intermediate element correspondences 300, 302). Each of the redundancy groups 202, 218, 206, 208, 210, 212, 216, 220, 222, 224, 226, 228, 232, 234 and 236 is associated with an element count 240 and respective metrics 242, 244, discussed in detail above. In some examples, values of the respective metrics 242, 244 can vary from the values provided in the first iteration (e.g., the values provided in FIG. 1A), because the metrics 242, 244 of FIG. 2B are determined in view of knowledge gained from the first iteration (i.e., the intermediate element correspondences 300, 302).

With continued reference to FIGS. 2A and 2B, the redundancy group 218 provides a suggested correspondence between the intermediate node 108 (E.InvoiceTo) and the intermediate node 144 (A.InvoiceTo). The redundancy group 216 provides a suggested correspondence between the intermediate node 106 (E.DeliverTo) and the intermediate node 142 (A.DeliverTo).

User input to the displayed redundancy groups can include a selection of one or more redundancy groups. In response to the user input, one or more respective correspondences are defined between intermediate elements for the second hierarchical level above the leaf node hierarchical level. The above-described iterative process can be repeated until correspondences are provided at all hierarchical levels between the schemas. Using the iterative approach of the present disclosure, the growing confidence from the user feedback loop is leveraged to better rank the redundancy groups with each iteration. In this manner, the quality of the support given to the user is increased.

Figure 3:
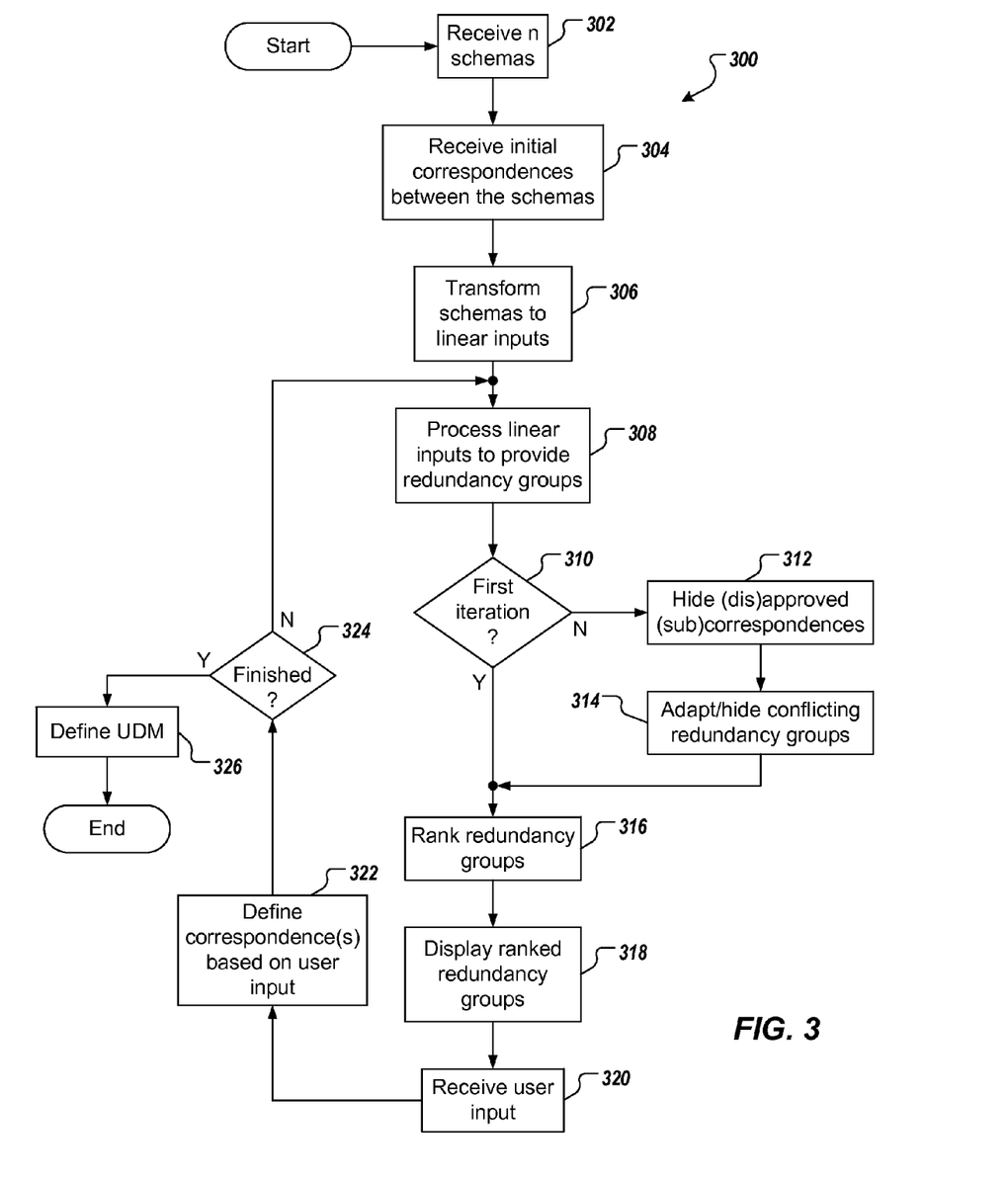
FIG. 3 depicts an example process that can be executed in implementations of the present disclosure.

Referring now to FIG. 3, an example process 300 can be executed in implementations of the present disclosure. In some examples, the process 300 can be provided in one or more computer programs executed using one or more computing devices.

Initially, n schemas are received (302). In some examples, each of the n schemas can be received from one or more computer-readable memories and includes nodes and relationships between nodes. Initial correspondences between the n schemas are received (304). In some examples, and as discussed herein, the initial correspondences include correspondences between lead nodes of the n schemas. Each of the n schemas is transformed to a linear input (306). The n schemas, as linear inputs, are processed to provide a plurality of redundancy groups (308). In some examples, and as discussed herein, the n schemas, as linear inputs, and the leaf correspondences are provided as input to a CFIM algorithm during an initial iteration, which generates the redundancy groups as outputs. In some examples, and as discussed herein, the n schemas, as linear inputs, the leaf correspondences and user-selected correspondences are provided as input to the CFIM algorithm during subsequent iterations.

It is determined whether the current iteration is the first iteration (310). If the current iteration is the first iteration, approved and/or disapproved redundancy groups can be hidden (312) and/or conflicting redundancy groups can be adapted and/or hidden (314). If it is determined that the current iteration is not the first iteration, the redundancy groups are ranked (316). As discussed in detail above, a rank can be calculated for each redundancy group and the redundancy groups. Ranked redundancy groups are displayed (318). For example, the redundancy groups can be put in rank order (e.g., descending) based on the respective ranks, and can be displayed to a user in the rank order.

User input to one or more redundancy groups is received (320). In some examples, and as discussed in detail herein, the user input can include approval of one or more redundancy groups, disapproval of one or more redundancy groups and/or modification of one or more redundancy groups. Correspondences between intermediate elements of the n schemas are defined based on the user input (322). It is determined whether matching of the n schemas is finished (324). If matching of the n schemas is not finished, the example process 300 loops back. If matching of the n schemas is finished, a UDM is defined based on the correspondences between the n schemas and is stored in computer-readable memory (326).

Figure 4:
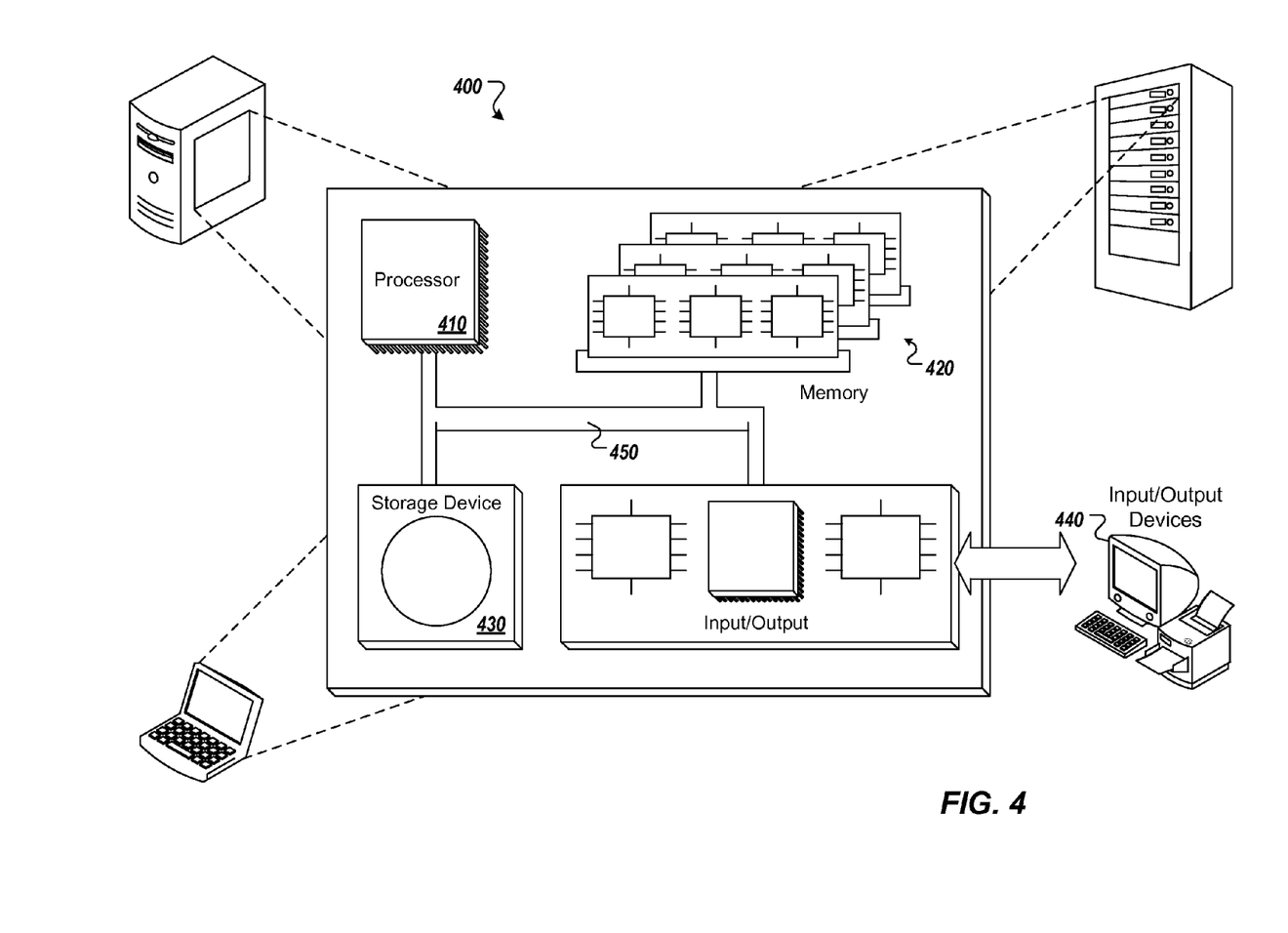
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method of providing a user-guided multi-schema integration, the method being executed using one or more processors and comprising:
   receiving a plurality of schemas from computer-readable memory, each schema of the plurality of schemas defining a data structure and comprising a plurality of intermediate elements and a plurality of leaf elements;
   receiving leaf correspondences from a computer-readable memory, the leaf correspondences matching leaf elements between schemas of the plurality of schemas and being associated with a maximum of a confidence level,
   processing the plurality of schemas and the leaf correspondences using closed frequent itemset mining (CFIM) to determine intermediate correspondences, the intermediate correspondences matching intermediate elements between schemas of the plurality of schemas and being associated to the confidence level that depends on a position of the intermediate elements in each schema of the plurality of schemas and to define a first plurality of redundancy groups, each redundancy group in the first plurality of redundancy groups comprising a proposed correspondence between intermediate elements of schemas of the plurality of schemas;
   displaying, using a display device, the first plurality of redundancy groups to a user;
   receiving user input, the user input comprising one or more actions to one or more redundancy groups in the first plurality of redundancy groups;
   processing the plurality of schemas and the leaf correspondences to hide at least one of the plurality of schemas based on the one or more actions to define a second plurality of redundancy groups; and
   displaying, using a display device, the second plurality of redundancy groups to the user.

2. The method of claim 1, wherein the one or more actions comprise approving a subset of redundancy groups of the first plurality of redundancy groups, the subset comprising at least one redundancy group, and, in response to approving the subset of redundancy groups, defining one or more respective correspondences between intermediate elements of schemas of the plurality of schemas.

3. The method of claim 2, wherein the at least one redundancy group is absent from the second plurality of redundancy groups.

4. The method of claim 2, further comprising identifying one or more sub-correspondences based on the subset of redundancy groups, wherein redundancy groups associated with the one or more sub-correspondences are absent from the second plurality of redundancy groups.

5. The method of claim 2, further comprising identifying one or more conflicting correspondences based on the subset of redundancy groups, wherein redundancy groups associated with the one or more conflicting correspondences are absent from the second plurality of redundancy groups.

6. The method of claim 2, wherein processing the plurality of schemas, the leaf correspondences and the one or more actions to define the second plurality of redundancy groups comprises processing the plurality of schemas, the leaf correspondences and the one or more respective correspondences between intermediate elements of schemas of the plurality of schemas.

7. The method of claim 1, wherein the one or more actions comprise disapproving a subset of redundancy groups of the first plurality of redundancy groups, the subset comprising at least one redundancy group.

8. The method of claim 7, wherein the at least one redundancy group is absent from the second plurality of redundancy groups.

9. The method of claim 1, further comprising:
   determining, for each redundancy group in the first plurality of redundancy groups, a rank to provide a plurality of ranks; and
   determining a rank order based on the plurality of ranks, wherein displaying the first plurality of redundancy groups comprises displaying redundancy groups of the first plurality of redundancy groups based on the rank order.

10. The method of claim 1, further comprising:
    determining, for each redundancy group in the second plurality of redundancy groups, a rank to provide a plurality of ranks; and
    determining a rank order based on the plurality of ranks, wherein displaying the second plurality of redundancy groups comprises displaying redundancy groups of the second plurality of redundancy groups based on the rank order.

11. The method of claim 1, wherein processing the plurality of schemas and the leaf correspondences using closed frequent itemset mining (CFIM) to define the first plurality of redundancy groups comprises transforming schemas of the plurality of schemas into respective linear inputs.

12. The method of claim 1, wherein the second plurality of redundancy groups comprises redundancy groups of the first plurality of redundancy groups.

13. The method of claim 1, further comprising:
    defining one or more respective correspondences between intermediate elements of schemas of the plurality of schemas based on the one or more actions; and
    providing a unified data model based on the leaf correspondences and the one or more respective correspondences.

14. A non-transitory computer-readable storage medium coupled to one or more processors and having instructions stored thereon which, when executed by the one or more processors, cause the one or more processors to perform operations for improving keyword searches, the operations comprising:
    receiving a plurality of schemas, each schema of the plurality of schemas defining a data structure and comprising a plurality of intermediate elements and a plurality of leaf elements;
    receiving leaf correspondences, the leaf correspondences matching leaf elements between schemas of the plurality of schemas and being associated with a maximum of a confidence level;

processing the plurality of schemas and the leaf correspondences using closed frequent itemset mining (CFIM) to determine intermediate correspondences, the intermediate correspondences matching intermediate elements between schemas of the plurality of schemas and being associated to the confidence level that depends on a position of the intermediate elements in each schema of the plurality of schemas and to define a first plurality of redundancy groups, each redundancy group in the first plurality of redundancy groups comprising a proposed correspondence between intermediate elements of schemas of the plurality of schemas;

providing the first plurality of redundancy groups for display to a user;

receiving user input, the user input comprising one or more actions to one or more redundancy groups in the first plurality of redundancy groups;

processing the plurality of schemas and the leaf correspondences to hide at least one of the plurality of schemas based on the one or more actions to define a second plurality of redundancy groups; and providing the second plurality of redundancy groups for display to the user.

15. A system, comprising:

a computing device; and a computer-readable storage device coupled to the computing device and having instructions stored thereon which, when executed by the computing device, cause the computing device to perform operations for improving keyword searches for enterprise services, the operations comprising:

receiving a plurality of schemas, each schema of the plurality of schemas defining a data structure and comprising a plurality of intermediate elements and a plurality of leaf elements;

receiving leaf correspondences, the leaf correspondences matching leaf elements between schemas of the plurality of schemas and being associated with a maximum of a confidence level;

processing the plurality of schemas and the leaf correspondences using closed frequent itemset mining (CFIM) to determine intermediate correspondences, the intermediate correspondences matching intermediate elements between schemas of the plurality of schemas and being associated to the confidence level that depends on a position of the intermediate elements in each schema of the plurality of schemas and to define a first plurality of redundancy groups, each redundancy group in the first plurality of redundancy groups comprising a proposed correspondence between intermediate elements of schemas of the plurality of schemas;

providing the first plurality of redundancy groups for display to a user;

receiving user input, the user input comprising one or more actions to one or more redundancy groups in the first plurality of redundancy groups;

processing the plurality of schemas and the leaf correspondences to hide at least one of the plurality of schemas based on the one or more actions to define a second plurality of redundancy groups; and providing the second plurality of redundancy groups for display to the user.

* * * * *